Figure 1:
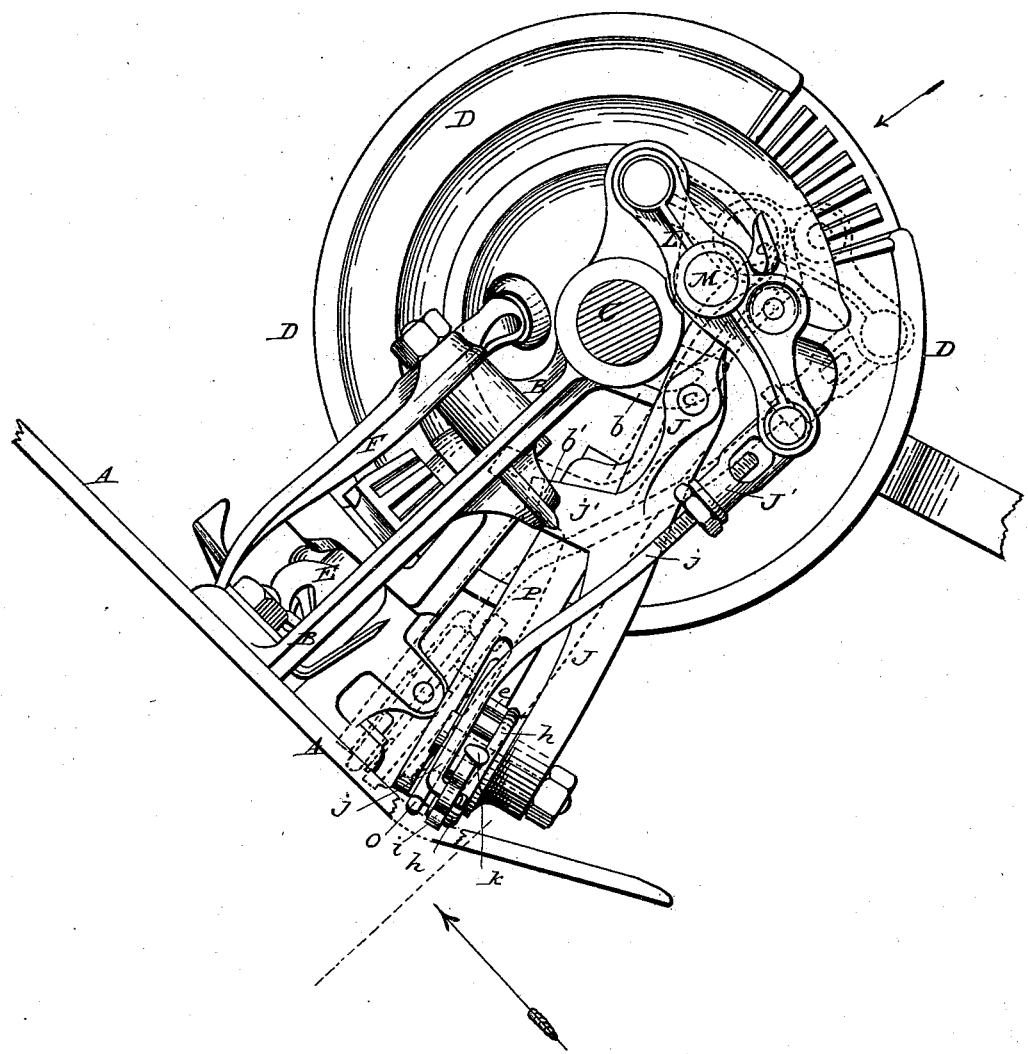

(No Model.) 5 Sheets—Sheet 3.

R. H. COREY.
CORD TYING MECHANINISM FOR GRAIN BINDERS.

No. 376,515. Patented Jan. 17, 1888.

WITNESSES
INVENTOR (No Model.) 5 Sheets—Sheet 4.

R. H. COREY.
CORD TYING MECHANINISM FOR GRAIN BINDERS.

No. 376,515. Patented Jan. 17, 1888.

WITNESSES
William H. Shipley
Wm. B. Kennedy

INVENTOR
R. H. Corey.
By his Attorney
Phil. T. Dodge (No Model.) 5 Sheets—Sheet 5.
R. H. COREY.
CORD TYING MECHANINISM FOR GRAIN BINDERS.
No. 376,515. Patented Jan. 17, 1888.

Fig. 9. ON LINE X—X 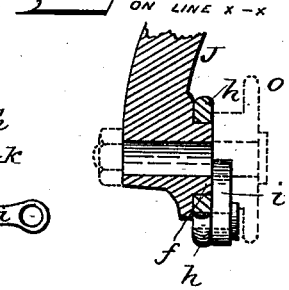

WITNESSES
William H. Shipley
INVENTOR
R. H. Corey
By his Attorney
Phil. T. Dodge.

UNITED STATES PATENT OFFICE.

RUFUS H. COREY, OF AUBURN, NEW YORK, ASSIGNOR OF ONE-HALF TO DAVID M. OSBORNE, OF SAME PLACE.

CORD-TYING MECHANISM FOR GRAIN-BINDERS.

SPECIFICATION forming part of Letters Patent No. 376,515, dated January 17, 1888.

Application filed June 16, 1886. Serial No. 205,364. (No model.)

*To all whom it may concern:*

Be it known that I, RUFUS H. COREY, of Auburn, in the county of Cayuga and State of New York, have invented certain Improvements in Cord-Tying Mechanisms for Grain-Binders, of which the following is a specification.

At the present day grain-binding machines of the "Appleby" type, in general use, are provided with a rotary bill to unite the ends of the applied cord and with a rotary peripherally-notched disk acting in connection with a shoe to hold the extremity of the cord. This cord-clamping disk is commonly mounted on a vibrating frame that it may move toward the tyer during the tying action, and thus slacken or yield up the cord in order to relieve the same from undue strain. The disk receives an intermitting rotary motion at the proper time to carry the cord between its edge and the clamping-shoe.

My invention has reference, mainly, to the means for holding and yielding up the cord, and has for its object the simplification of the mechanism, the avoidance of springs, and the operation of the parts in a positive manner; and to this end it consists in an improvement in the construction of the vibratory frame by which the clamping-disk is carried, in improved means for vibrating and locking said frame, in a shoe of improved construction operating in connection with the disk to hold the cord, and in an improved construction of the ratchet mechanism for rotating the disk.

As my improvements are applicable to machines which are in other respects of ordinary construction, I have illustrated in the drawings only such parts as are necessary to an understanding of my invention.

Figure 2:
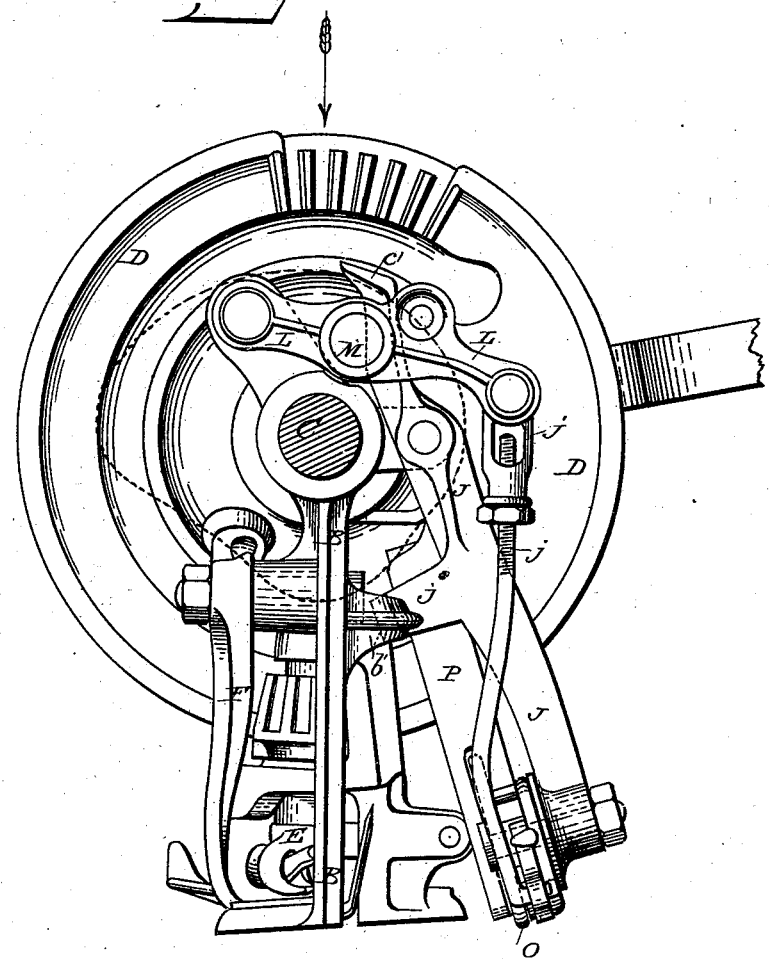
Figure 3:
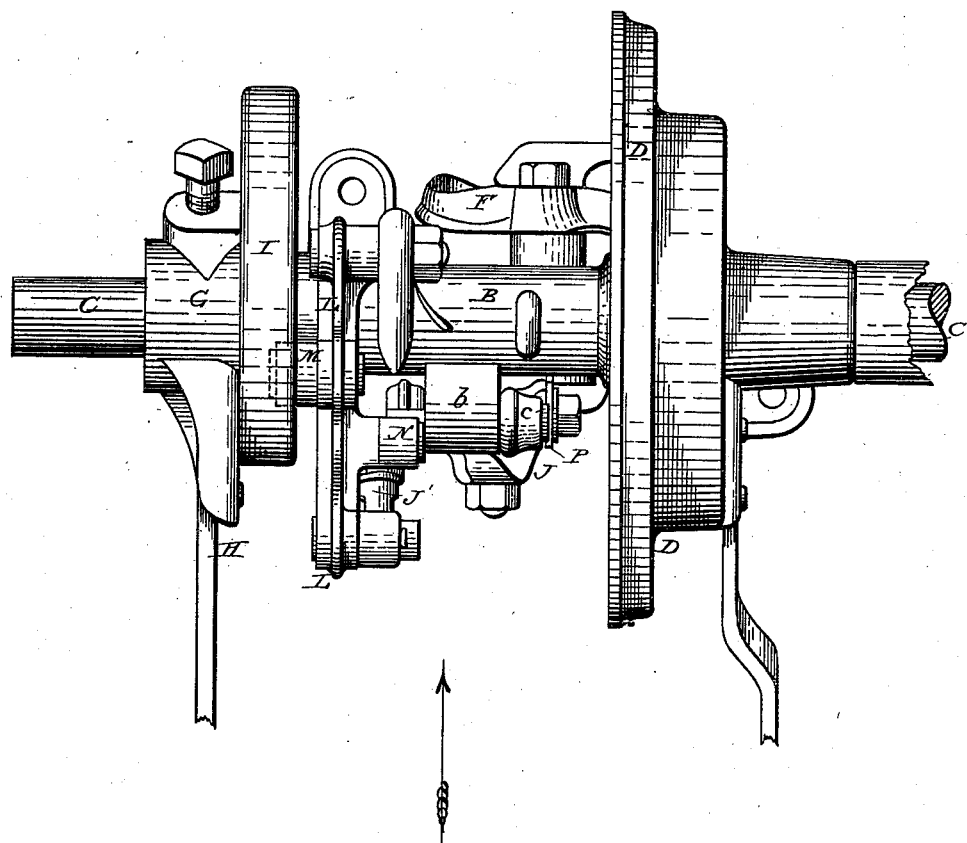
Figure 4:
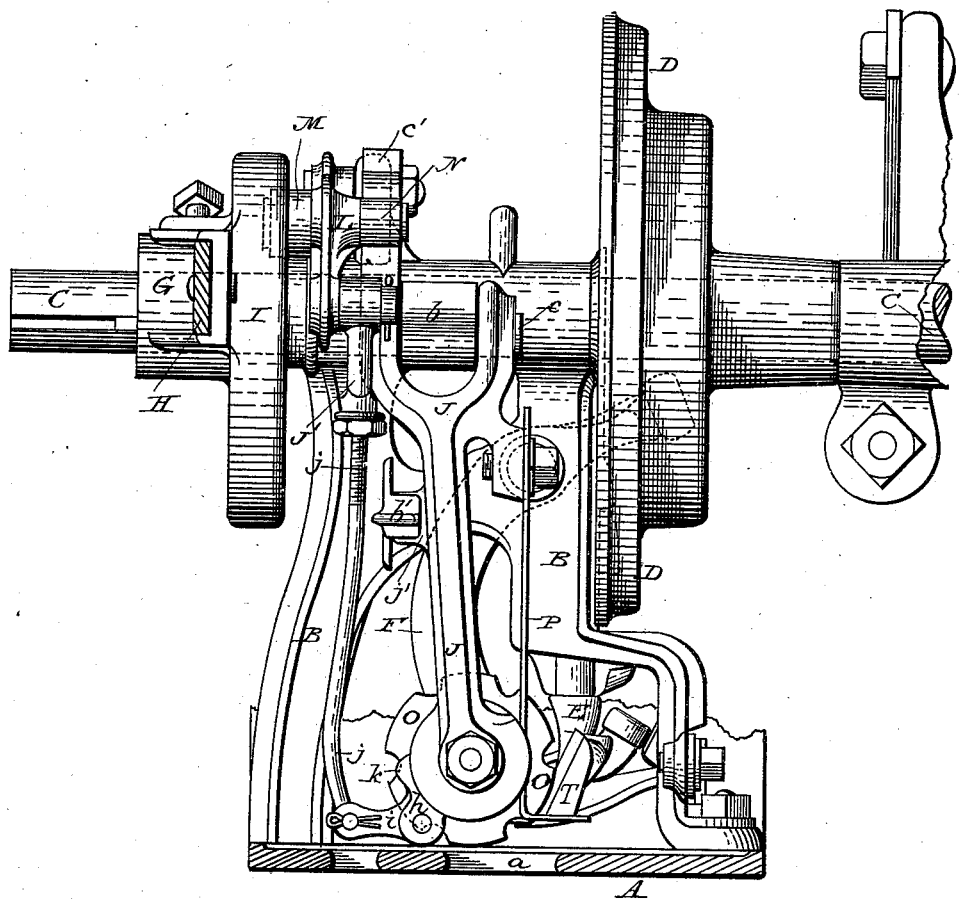
Figure 5:
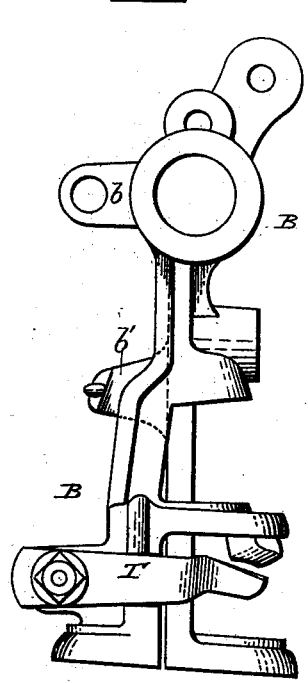
Figure 6:
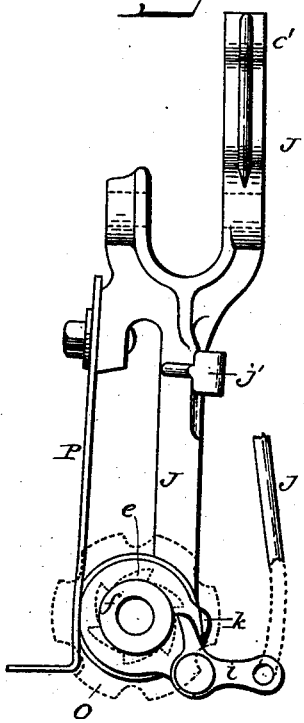
Figure 7:
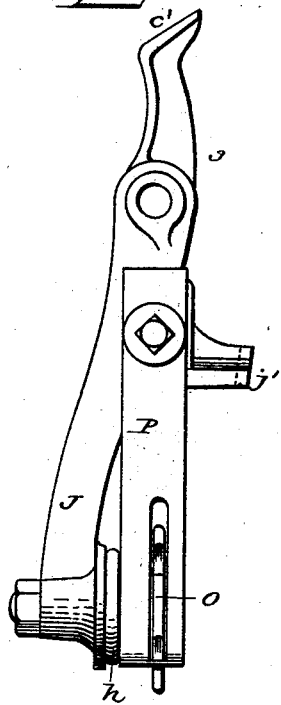
Figure 8:
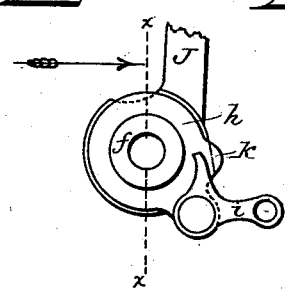
Figure 11:
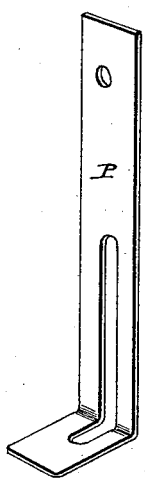
Figure 10:
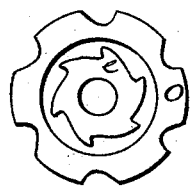

Referring to the accompanying drawings, Figure 1 represents a side elevation of the entire cord-tying, clamping, and cutting mechanism with my improvements embodied therein, the movements of the several parts being indicated in dotted lines. Fig. 2 is a similar elevation, the parts being detached from the breast-plate by which they are supported. Fig. 3 is a plan view looking in the direction indicated by the arrow in Figs. 1 and 2. Fig. 4 is an elevation looking in the direction indicated by the arrow in Fig. 3. Fig. 5 is an edge view of the knotter frame or standard which supports the other operative parts. Fig. 6 is a top plan view of the vibratory or swinging frame on which the cord-clamping disk is mounted, the disk clamping and operating pawl being shown in position thereon. Fig. 7 is an edge view of the parts shown in the preceding figure. Fig. 8 is a top plan view of the pawl and plate for rotating the clamping-disk, together with the end of the frame on which they are supported. Fig. 9 is a cross-section on the line $x\,x$ of the preceding figure. Fig. 10 is a face view of the cord-clamping disk. Fig. 11 is a perspective view of the cord-clamping spring detached.

Referring to the drawings, A represents the usual stationary breast-plate which overlies the grain-passage of the binder, and which is provided with the usual slot, $a$, through which the needle or binder arm ascends in delivering the binding-cord around the gavel to the tying mechanism.

B represents the knotter frame or standard, bolted rigidly to the top of the breast-plate and supporting at its top, in bearings formed for the purpose, the horizontal main shaft C, which carries the main gear-wheel D, provided, as usual, with teeth and delay-surfaces to operate the pinion of the tying-bill E, and with a cam to actuate the vibratory cord-guiding and knife-carrying arm F, as in existing machines. This main shaft also carries a hub, G, provided with the bundle-ejecting arm H and with the wheel I, having a cam-groove in its side face to actuate the cord-clamping devices, as hereinafter explained.

For the purpose of supporting the cord-clamping disk, I provide a light and simple frame, J—such as shown in Figs. 6 and 7—cast complete in one piece. At one end this frame is forked to embrace the stud $b$ on the stationary knotter-frame and provided with openings to receive a transverse pivot, $c$, by which it is connected to said stud, this arrangement supporting the frame J, but allowing its lower end to rise and fall. On the lower vibratory end of the frame I mount the cord-clamping disk O, of ordinary or substantially the ordinary form, which lies below or behind the tyer, as shown in Fig. 1. At its upper end the inner arm of the frame is extended above its pivot, as shown at $c'$, and fashioned into the form shown in Figs. 6 and 7, for a purpose which will presently appear.

To an appropriate ear on the knotter-frame B, I pivot one end of a lever, L, having on one side a stud or roller, M, which enters the groove of the cam-wheel I, before alluded to, and from which the lever receives a vibratory motion. On the opposite side of this lever I fix a stud or roller, N. As the lever is depressed, the stud N rides against the beveled end of and beneath the arm $c'$ of the disk-supporting frame J, causing the lower end of the frame, with the disk thereon, to move downward away from the tyer, and holding it for the time being rigidly in position; but as the lever swings upward the lower end is carried away from under the arm $c'$, thereby releasing the frame J, so that its lower end, with its clamping-disk, may swing upward toward the tyer during the formation of the knot.

The descending movement of the frame J is limited by a lip, $j'$, formed on its edge and adapted to engage a corresponding lip, $b'$, on the under side of the knotter frame or standard B.

The clamping-disk O is provided, as usual, with a ratchet-hub, $e$, on one side. Beneath the disk, concentric therewith, on a journal, $f$, formed on the supporting-frame J, I mount a loose ring or plate, $h$, and to one edge of this plate I pivot, midway of its length, an annular pawl or dog, $i$, one end of which engages the ratchet-teeth of the disk, while the opposite end is connected to an operating-rod, $j$, attached at its upper end to the end of the lever L, before described. As the lever swings upward, it causes the rod J to lift the outer end of the pawl, whereby it is first caused to engage at its inner end with the disk and, as the motion is continued, to revolve with its supporting-plate, thereby imparting the necessary rotary motion to the disk. The reverse motion of the lever causes the pawl to disengage from the disk and move backward in position to engage the next tooth.

In order to secure the proper action of the parts the pawl-supporting plate $h$ is provided with a lip, $k$, against which the pawl engages during its backward movement, so that the plate is compelled to turn with the pawl in its retreat. While I prefer to use this stud as the simplest device for the purpose, I may use any other appropriate stop which will limit the motion of the pawl with reference to its supporting-plate.

From the foregoing description it will be perceived that the cam I and lever L serve the twofold purpose of depressing and locking the disk-supporting frame and of effecting the rotary motion of the disk at the proper time. In this regard my construction is far superior to that in existing machines, in which it is customary to provide separate appliances for operating the disk and moving the frame. It will be observed that under my construction the frame J is positively depressed, in order to bring the disk at the proper distance from the tyer and in the proper position to have the cord placed in its edge by the binding-needle. The rod J may be connected to the operating-lever L directly, or it may be threaded into a plate, J', pivoted to the lever, this arrangement permitting the rod to be adjusted in order to vary the position at which the disk is stopped in its rotation, as may be required in order to leave the notches at the proper point to receive the cord.

It is to be remarked that my holder-supporting frame J consists of but a single bar or arm having one end adapted to receive the disk and the opposite end adapted to receive the supporting-pivot. Thus formed the frame is exceedingly light and simple, and by reason of its small size it admits of the other parts being arranged in a much more compact form than in existing machines.

At the present time it is customary to use with the cord-clamping disk such as herein shown a solid shoe grooved in one edge to receive the disk, and urged against the disk by a separate spring, in order that the cord may be held between them with a yielding pressure. In place of this disk and spring I employ the single elastic arm P, which serves the purpose of both of the former parts and in a more efficient manner. As shown in the several figures, the arm P consists of a flat strip of steel or equivalent elastic material bolted at one end rigidly to the frame J and provided at the opposite end with a slot, through which the edge of the disk projects. The extremity of the arm may be turned at a right angle, or thereabout, as shown in the drawings, to facilitate the passage of the cord thereunder. As the disk revolves, the cord, lying transversely in its edge, is carried forward against the spring, which acts to bend the cord over the edge of the disk in such manner that it is held securely thereby. The slot, being continued to the end of the arm, permits the lint and short ends of the cord to pass freely therefrom, so that there is no danger of the parts becoming clogged or of their operation being impaired from this source.

To the frame B, I secure rigidly a knife, T, in suitable position to sever the cord as it is carried against the same by the movement of the cam.

I am aware that a main frame or standard has been provided with an angular arm to extend past and engage below a vibratory clamp-supporting frame, and this I do not claim. My invention in this regard resides in combining the lip on the standard with a lip on the inner side of the vibratory frame J, by which I avoid the necessity of the long-exposed arm heretofore employed and the various evils incident thereto.

I am aware that it is old to mount the edge of a cord-clamping disk between two side plates which clamp the cord against its side faces and which are adapted to yield laterally or in the direction of the axis of the disk. It is to be observed that the spring-arm which I employ is arranged to yield in a radial direction.

I am aware that a peripherally-notched clamping-disk has been seated at its edge in a shallow groove in the inner face of a radially-movable spring-supported shoe, such being, in fact, the construction which is most commonly used in the art at the present day. My device differs therefrom in construction in that my shoe is provided with an opening or slot therethrough from front to back and arranged so that it may pass inward freely astride of the edge of the disk toward its center and beyond the bottom of the cord-receiving notches, whereby it is enabled the better to adjust itself to the varying size of the cord and to bend the cord down and hold it against the side faces of the disk as well as in the bottom of the notches. In practice I find that the radially-yielding arm or shoe, when slotted so that the disk may pass through and project beyond it, acts in a manner materially different from that of the grooved shoe, which bears upon and is limited in its inward movement by contact with the edge of the disk.

Having thus described my invention, what I claim is—

1. The vibratory frame J, having the cord-clamp thereon, in combination with the lever L, pivoted to a fixed support and provided with a stud or roller acting on the end of the frame to cause its depression, and mechanism, substantially as described, for vibrating said lever.

2. The pivoted frame J, having the arm $c'$, extended at one end beyond the pivot and having the cord-clamp mounted on the opposite end, in combination with the lever L, having the roller or projection to act on the arm $c'$, and the cam I, arranged to actuate the lever, substantially as shown.

3. In combination with the vibrating frame J, pivoted at a point distant from its end, the cord-clamping disk mounted in one end of said frame, the lever L, pivoted to a fixed support and provided with a roller or projection arranged to act directly on that end of the frame which is distant from the clamp, and devices, substantially as shown, connecting said lever with the cord-clamp, and mechanism, substantially as shown, for vibrating said lever, whereby the lever is enabled to answer the double purpose of vibrating the frame and operating the clamp.

4. The combination of the knotter frame or standard, the frame J, pivoted thereto and extended rearwardly beyond its pivot, the cord-clamping disk mounted on said frame, the cam I, the lever L, actuated by said cam and provided with a stud or roller acting on the frame J, and a ratchet mechanism connecting said lever with the clamping-disk, substantially as described.

5. The pivoted clamp-supporting frame J, having the rear arm, $c$, with a beveled end, in combination with a lever, L, provided with roller N, and means, substantially as described, for vibrating said lever and carrying its roller against the end of said arm and beneath the same, as described, whereby said roller is caused to first effect the movement of the vibratory frame and thereafter lock the same in position.

6. In combination with the sustaining-frame, the clamping-disk provided with a ratchet-hub on its side, the independently-turning plate $h$, the pawl $i$, pivoted at its middle to said plate, and the reciprocating rod $j$, attached to the tail end of said pawl to throw its nose into engagement with the ratchet-hub, as described.

7. In combination with a slotted arm or shoe arranged to yield radially in relation thereto, the peripherally-notched disk having its edge seated in the slot and adapted to project through and beyond the arm, as described, whereby the arm is adapted to adjust itself to the varying size of the cord and to confine the latter in the notches and also against the side faces of the disk.

8. In combination with a supporting-frame, the peripherally-notched disk journaled thereon and the elastic arm having one end fixed rigidly to the frame and the opposite end provided with an open slot through it from front to back, said slotted end arranged to straddle the edge of the disk and yield radially in relation thereto, as described.

9. In combination with the notched disk, the cord-retaining clamp or shoe consisting of a flat spring having one end bent upward, as described, and having a longitudinal slot extended to and through the angle, as shown.

In testimony whereof I hereunto set my hand, this 25th day of May, 1886, in the presence of two attesting witnesses.

RUFUS H. COREY.

Witnesses:
M. J. BULKLEY,
C. T. BALDWIN.